US008648796B2

(12) United States Patent
Griffin et al.

(10) Patent No.: US 8,648,796 B2
(45) Date of Patent: Feb. 11, 2014

(54) STROKE BASED INPUT SYSTEM FOR CHARACTER INPUT

(75) Inventors: Jason T. Griffin, Kitchener (CA); Sherryl Lee Lorraine Scott, Toronto (CA); Timothy Koo, Cambridge (CA)

(73) Assignee: BlackBerry Limited, Waterloo, Ontario (CA)

(*) Notice: Subject to any disclaimer, the term of this patent is extended or adjusted under 35 U.S.C. 154(b) by 670 days.

(21) Appl. No.: 12/327,880

(22) Filed: Dec. 4, 2008

(65) Prior Publication Data

US 2010/0141584 A1    Jun. 10, 2010

(51) Int. Cl.
*G09G 5/00*    (2006.01)

(52) U.S. Cl.
USPC ............................. 345/156; 345/157; 345/167

(58) Field of Classification Search
USPC ........................... 345/156–158, 167, 169, 171
See application file for complete search history.

(56) References Cited

U.S. PATENT DOCUMENTS

| | | | |
|---|---|---|---|
| 7,164,367 B2* | 1/2007 | Kushler et al. | 341/28 |
| 2002/0194001 A1* | 12/2002 | Sugano | 704/270 |
| 2003/0006956 A1* | 1/2003 | Wu et al. | 345/156 |
| 2004/0017946 A1 | 1/2004 | Longe et al. | |
| 2004/0223644 A1 | 11/2004 | Meurs | |
| 2005/0152600 A1 | 7/2005 | Chen et al. | |
| 2006/0170657 A1* | 8/2006 | Lin et al. | 345/171 |
| 2008/0260252 A1 | 10/2008 | Borgaonkar et al. | |
| 2009/0153471 A1* | 6/2009 | Lee | 345/156 |

FOREIGN PATENT DOCUMENTS

| | | |
|---|---|---|
| CN | 1606753 | 4/2005 |
| JP | 06-242882 | 9/1994 |
| JP | 09-190499 | 7/1997 |
| JP | 11-053104 | 2/1999 |
| JP | 2005-202962 | 7/2005 |
| JP | 2005-228180 | 8/2005 |
| WO | 01/45034 A1 | 6/2001 |

OTHER PUBLICATIONS

European Office Action issued in European Patent Application No. 08170736.6, dated Mar. 29, 2011 (6 pages).
Korean Office Action, along with English translation, issued in Korean Patent Application No. 10-2009-0119979, dated Apr. 11, 2011 (8 pages).
Office Action for Application No. 2009-275950, from the Japanese Patent Office, dated Aug. 15, 2011.
Office Action for Application No. 2,686,919, from the Canadian Intellectual Property Office, dated Feb. 14, 2012.
Office Action for Application No. 200910258481.5, from the State Intellectual Property Office of People's Republic of China, dated Jun. 12, 2012.
Notice of Final Rejection for Application No. 2009-275950, from the Japanese Patent Office, dated Jun. 6, 2012.

(Continued)

*Primary Examiner* — Christopher E Leiby
(74) *Attorney, Agent, or Firm* — Finnegan, Henderson, Farabow, Garrett & Dunner LLP (57) ABSTRACT

An improved handheld electronic device includes an input apparatus, preferably a trackball, an output apparatus, namely a display, and a processor apparatus. The processor apparatus is structured to execute a number of routines including a stroke-based input user interface routine. The stroke-based input user interface routine is structured to present a user interface on the display. The user interface includes an active portion, a filter portion and an output portion.

21 Claims, 5 Drawing Sheets

(56) References Cited

OTHER PUBLICATIONS

Third Office Action for Application No. 200910258481.5, from the State Intellectual Property Office of People's Republic of China, dated Dec. 19, 2012.

Fourth Office Action for Application No. 200910258481.5, from the State Intellectual Property Office of People's Republic of China, dated Jun. 20, 2013.

Office Action for Application No. 2,686,919, from the Canadian Intellectual Property Office, dated Sep. 9, 2013.

* cited by examiner

| 一 | 中 1 | 虽 2 | 同 3 |
|---|---|---|---|
| 丨 | 由 4 | 足 5 | 跟 6 |
| 丿 | 跑 7 | 思 8 | 累 9 |
| 丶 | 上一页 * | 哭 0 | 下一页 # |
| 乛 | 丨乛一丨 | | |

*FIG.5A*

| 一 | 中 1 | 虽 2 | 同 3 |
|---|---|---|---|
| 丨 | 由 4 | 足 5 | 跟 6 |
| 丿 | 跑 7 | 思 8 | 累 9 |
| 丶 | 上一页 * | 哭 0 | 下一页 # |
| 乛 | 丨乛一丨 | | |

| 一 | 断 1 | 期 2 | 等 3 |
|---|---|---|---|
| 丨 | 央 4 | 午 5 | 国 6 |
| 丿 | 秋 7 | 签 8 | 和 9 |
| 丶 | 上一页 * | 级 0 | 下一页 # |
| 𠃌 | | | |

| 一 | 情 1 | 企 2 | 际 3 |
|---|---|---|---|
| 丨 | 内 4 | 外 5 | 力 6 |
| 丿 | 庆 7 | 货 8 | 产 9 |
| 丶 | 上一页 * | 营 0 | 下一页 # |
| 𠃌 | 八 | | |

| 一 | 生 1 | 工 2 | 口 3 |
|---|---|---|---|
| 丨 | 类 4 | 力 5 | 才 6 |
| 丿 | 们 7 | 人 8 | 数 9 |
| 丶 | 上一页 * | 体 0 | 下一页 # |
| ㄱ | 八 | | |

STROKE BASED INPUT SYSTEM FOR CHARACTER INPUT

BACKGROUND

1. Field

The disclosed and claimed concept relates generally to handheld electronic devices and, more particularly, to handheld electronic devices having a display for a stroke-based input system, wherein the strokes represent one of a number of character segments and wherein multiple standard character segments are used to assemble a character, the strokes being entered upon a display active portion which is adjacent the display output portion, whereby a user may maintain focus on the device display.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices. Such devices typically have a key-based input device, such as, but not limited to, a full or reduced QWERTY keyboard, or, a keypad as on a telephone and which typically requires a multitap type input or which relies upon disambiguation software. Such input devices are generally acceptable for languages that use a limited number of letters to form larger words. However, Asian languages typically utilize ideograms, that is, individual symbols that represent an entire word or other language element. Such languages typically have many thousands of common characters. As such, it is impractical to have a keyboard or keypad representing the numerous ideograms of eastern languages.

To overcome this barrier to utilizing Asian languages on handheld devices, methods and associated devices have been developed wherein separate strokes used in creating ideograms are represented by separate keys. Thus, while the individual strokes have no meaning, the stroke-keys may be used in a manner similar to letters in a western language. That is, just as multiple letters are used to form words, multiple stroke-keys may be used to form ideograms. Further, just as disambiguation software and predictive software may be used to aid the input of western words, similar disambiguation software and predictive software may be used to aid in selecting the intended ideogram.

Various schemes, or layouts, of the stroke-keys have been used. For example, one scheme placed right angle, or "corner," stroke-keys at the corners of a telephone keypad. Other schemes placed selected strokes in the order identified by China's Ministry of Information Industry. That is, the government of China has identified, and provided an order for, five common strokes in a well known order, not unlike the musical scale of do, re, mi. These strokes include heng, a horizontal stroke, shu, a vertical stroke, pie, a downward slant from left to right, na, a downward slant from right to left, and zhe, a right angle stroke having a horizontal line from left to right, followed by a downward line. Thus, for example, on a twelve key keypad (three keys by four keys as on a standard telephone) the "1" key may include no letters and the heng stroke, the "2" key may include the letters "ABC" as well as the shu stroke, and so on. Thus, those who have grown accustomed to the Chinese Ministry of Information Industry's order are quickly able to find the desired stroke-key. Additional keys may have other common strokes such as a "dot" or a complete square.

While this method allows a user to approximate a number of ideograms, the large variety of ideograms with similar strokes and a lack of a specific order of entering the stroke-keys mean that disambiguation software and predictive software are typically needed to identify the intended ideogram. In practice, users of such key based entry method typically enter at least two strokes to create a partial ideogram. Once the strokes are entered, the user is presented with a list displaying a number of ideograms that the disambiguation software and/or predictive software suggest as the desired ideogram. If the desired ideogram is not on the initial list, the user enters additional strokes. After each stroke is entered, the disambiguation software and/or predictive software may suggest new ideograms based on the newly input strokes.

Unfortunately, a key-based input system requires the user to constantly shift focus between the keypad and the screen. That is, as the user enters a sequence of stroke-keys, the user must focus, that is, glance, at the display between each key input in order to determine if the disambiguation software and/or predictive software has presented the desired ideogram.

BRIEF DESCRIPTION OF THE DRAWINGS

A full understanding of the disclosed and claimed concept can be obtained from the following Description when read in conjunction with the accompanying drawings in which:

FIGS. 5A-5E show the display during stroke based input.

Similar numerals refer to similar parts throughout the specification.

DESCRIPTION

As used herein, the word "select(s)" or "selected" means that, after a field, element, object, or icon is actuated, the processor apparatus 16 thereafter performs an associated function. As is known, a field, element, object, or icon may be identified by placing a cursor over the field, element, object, or icon and then actuated by an input mechanism. For example, a trackball may be used to position a cursor over a field, element, object, or icon and depressing the trackball or another key/button may be the input mechanism.

As used herein, "present" and variations thereof, relate to an electronic construct created by a routine being executed in a processor apparatus and transmitted as a signal to a display which converts the signal into a viewable image. Thus, it is understood that when a routine "presents" any image, the routine is "presenting" the image via a processor apparatus and display.

As used herein, "stroke-based input" is input having a starting point, an ending point and a path therebetween. It is noted that a stroke-based input device may provide stroke-based input as well as other input such as, but not limited to, input by positioning a cursor over an icon or field and allowing a user to select that icon or field.

As used herein, the expression "a number of" and variations thereof shall refer broadly to any nonzero quantity, including a quantity of one.

Figures 1, 2:
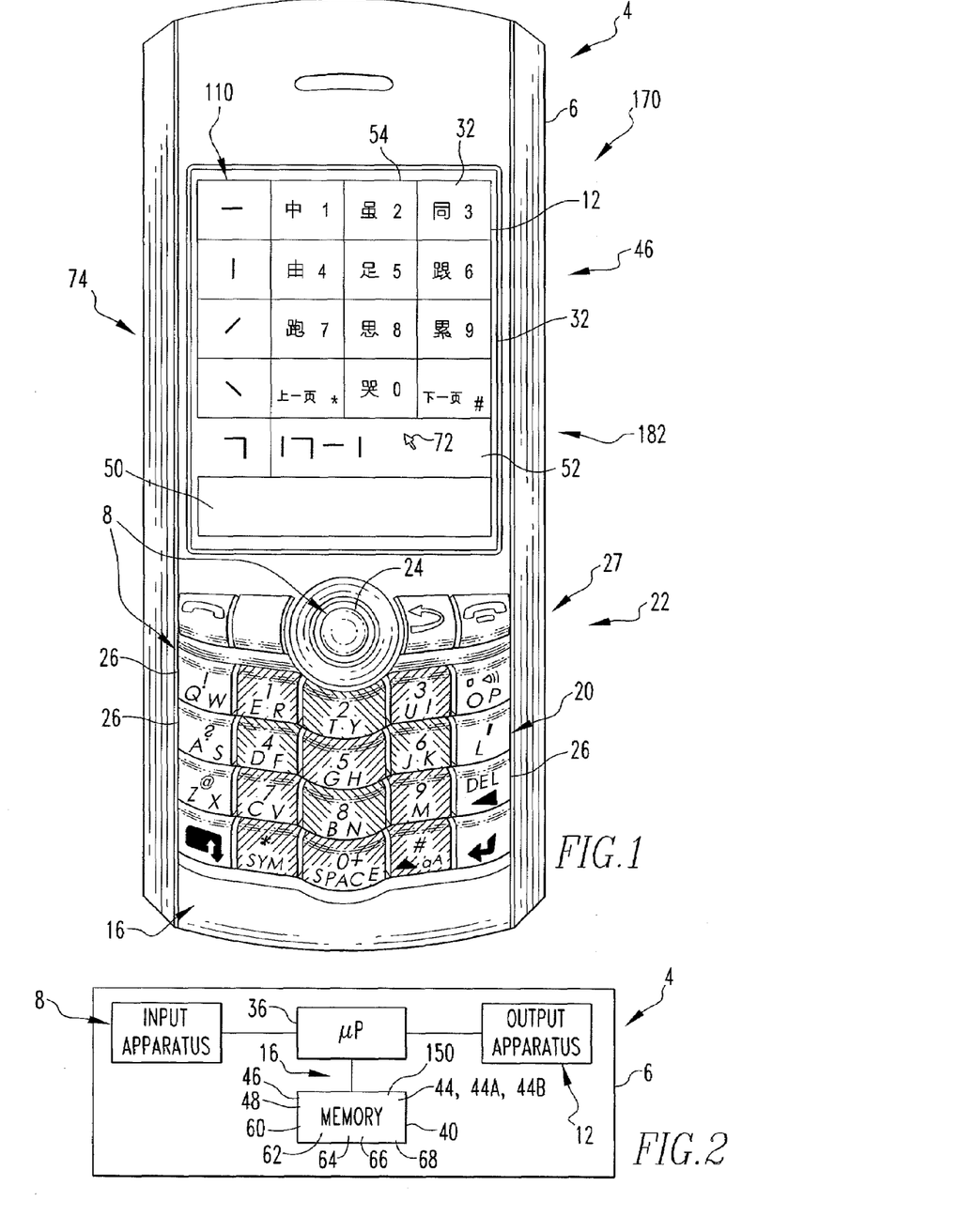
FIG. 1 is a front elevational view of an exemplary handheld electronic device in accordance with the disclosed and claimed concept upon which is performed an improved method in accordance with the disclosed and claimed concept.
FIG. 2 is a schematic depiction of the handheld electronic device of FIG. 1.

An improved handheld electronic device 4 in accordance with the disclosed and claimed concept is indicated generally in FIG. 1 and is depicted schematically in FIG. 2. Generally, and as discussed in detail below, the handheld electronic device 4 includes an input apparatus 8, preferably a trackball 24, an output apparatus 12, namely a display 74, and a processor apparatus 16. The processor apparatus 16 is structured to execute a number of routines 44 (discussed below) including a stroke-based input user interface routine 62. The stroke-based input user interface routine 62 is structured to present a user interface 32 on the display 74. The user interface 32 includes an active portion 52, a filter portion 54 and an output portion 50. The device 4 further includes a cursor routine 44 structured to create a cursor 72 that is presented on, and movable over, the display 4. The user utilizes a stroke-based input device 22 to enter strokes and may use the cursor 72 as an input device over the display filter portion 54. The user enters the stroke-based input mode by selecting a specific key 26, combination of keys 26, or by selecting an icon with the cursor 72. Once the stroke-based input mode is selected, use of the trackball 24 will create modified strokes 90 (FIG. 4) in the display active portion 52. Once a number of strokes have been entered, a disambiguation routine 44A produces a list of probable ideographic language objects 170 that is presented in the display filter portion 54. If the desired ideographic language object 46 is presented, the user may select the ideographic language object 46 and the selected ideographic language object 46 is presented in the display output portion 50. Preferably, the display filter portion 54 presents the probable ideographic language objects 170 in a pattern corresponding to a set of highlighted keys 27. By pressing the highlighted key 27 at a specific location in the pattern, the user selects the probable ideographic language objects 170 at the corresponding location in the display filter portion 54. If the desired ideographic language object 46 is not presented initially, the user enters one or more additional strokes with the cursor 72 in the display active portion 52. As the user enters more strokes, the disambiguation routine 44A analyzes the strokes and continually updates the list of probable ideographic language objects 170 that is displayed in the display filter portion 54 until the user selects an ideographic language object 46 from the list. Because the display active portion 52 and the display filter portion 54 are disposed immediately adjacent to each other, the user's focus does not leave the display 74.

The improved handheld electronic device 4 comprises a housing 6, and further comprises an input apparatus 8, an output apparatus 12, and a processor apparatus 16 disposed on the housing 6. The input apparatus 8 provides input to the processor apparatus 16. The processor apparatus 16 provides output signals to the output apparatus 12.

The input apparatus 8 comprises a keypad 20 and a stroke-based input device 22 which is preferably a trackball 24. The keypad 20 in the exemplary embodiment depicted herein comprises a number of keys 26 that are each actuatable to provide input to the processor apparatus 16. Preferably, the keys 26 are disposed in a regular pattern, such as, but not limited to, a rectangular grid. Further, in the group of keys 26, a selected number may be highlighted keys 27 that include an additional indicia, e.g. a different color, that makes the highlighted keys 27 identifiable as a related set of keys 26. The highlighted keys 27 are also, preferably, disposed in a regular pattern. Many of the keys 26 each have a number of letters, i.e., linguistic elements, assigned thereto. For instance, one of the keys 26 has assigned thereto the letters "A" and "S". Another of the keys 26 has assigned thereto the letters "Q" and "W". The letters of the exemplary keypad 20 are in an arrangement of a reduced QWERTY keyboard. Further, the highlighted keys 27 may be the group of keys 26 having a number assigned thereto.

The trackball 24 is rotatable to provide navigational and other input to the processor apparatus 16, and additionally is translatable in a direction inwardly toward the handheld electronic device 4 to provide other input, such as selection inputs. The trackball 24 is freely rotatable on the housing 6 and thus is able to provide navigational inputs in the vertical direction, i.e., the up-down direction, in the horizontal direction, i.e., the left-right direction, as well as combinations thereof. The keys 26 and the trackball 24 serve as input members which are actuatable to provide input to the processor apparatus 16.

It is understood that the stroke-based input devices 22 discussed above are known and are not part of this invention. Further, the operation and mechanics of the input devices 22, e.g., the routines for tracking and display of a cursor 72, the recording of the provided stroke, the detection of the start/end of the provided stroke, providing a corresponding display of the provided stroke, and so forth are also known in the art and are not part of this invention.

The exemplary output apparatus 12 comprises a display 74. Examples of other output devices would include a touch-sensitive display, an audio speaker, and so on. The display 74 is structured to produce an image in response to output from the processor apparatus 16 and selected routines 44 executed therein, as discussed below. The selected routines 44 requiring use of the display 74 include a user interface routine 60 (discussed below). As an example, one user interface routine 60 and user interface 32 discussed herein shall be presented as being part of, or related to, a message routine 44B 44 to compose messages such as emails. Of course, the disclosed user interface 32 and other aspects of the disclosed concept may be practiced with other routines 44 wherein a user is entering ideographic language objects 46.

The processor apparatus 16 comprises a processor 36 and a memory 40. The processor 36 may be, for example and without limitation, a microprocessor (μP) that interfaces with the memory 40. The memory 40 can be any one or more of a variety of types of internal and/or external storage media such as, without limitation, RAM, ROM, EPROM(s), EEPROM (s), FLASH, and the like that provide a storage register, i.e., a machine readable medium, for data storage such as in the fashion of an internal storage area of a computer, and can be volatile memory or nonvolatile memory. The memory 40 has stored therein a number of routines 44 that are executable on the processor 36, a number of ideographic language objects 46 and a number of frequency objects 48. The number of routines 44 include at least one user interface routine 60 and at least one disambiguation routine 44A. As is known in the art, various routines 44 receive user input from the input apparatus 8, process that input within the processor apparatus 16 which, in turn, provides output signals to the output apparatus 12. It is noted that different routines 44 may, and are in fact likely to, have different user interfaces. That is, for example, a game routine 44 and a message routine 44B will often use the input apparatus 8 in very different ways. Other routines 44 that are part of this invention are discussed below.

The at least one user interface routine 60 includes a stroke-based input user interface routine 62. The stroke-based input user interface routine 62 includes an interface input routine 64 and an interface output routine 66. As discussed in detail below, the interface input routine 64 includes, or may interface with, a stroke-based input device routine 68 as well as a keypad input routine 70 structured to accept input from the keypad 20. Further, as is known in the art, the keypad input routine 70 may assign, or associate, selected inputs to selected keys 26 wherein the selected inputs are different from the linguistic elements normally assigned thereto.

The interface output routine 66 is structured to present an image on the display 74 and may use any other component of the output apparatus 12. The image on the display 74 is the user interface 32. The interface output routine 66 is structured to present on the display 74, and therefore the user interface 32 includes, an output portion 50, an active portion 52 and a filter portion 54. As noted above, as an example herein, the stroke-based input user interface routine 62 will be related to a message routine 44B, and more specifically to the process of composing a message. Thus, the stroke-based input user interface routine 62 utilizes the display active portion 52 to allow the user to provide stroke-based input. The stroke-based input user interface routine 62 utilizes the display filter portion 54 to provide a list of disambiguated output. The stroke-based input user interface routine 62 utilizes the display output portion 50 to display the message to be sent. The display output portion 50, display active portion 52 and display filter portion 54 are, generally, disposed adjacent to each other. As is known in the art, the stroke-based input device routine 68 presents a movable cursor 72 on the display 74. The cursor 72 is free to travel between the display output portion 50, display active portion 52 and display filter portion 54.

Prior to discussing how the stroke-based input user interface routine 62 receives and processes stroke based input, a discussion of "standard strokes 80" and "modified strokes 90" is appropriate. As noted above, ideographic language objects 46 are created from a series of strokes, and may be represented by a series of standard strokes 80. The standard strokes 80 include a number of generally straight lines. However, given the imprecise nature of how a trackball 24 is used, the provided stroke may not conform exactly to a standard stroke 80. That is, the user provides a "modified stroke" 90 and the stroke-based user interface routine 62 is structured to receive stroke-based input in the form of the modified stroke 90 and correlate the modified stroke 90 to a standard stroke 80.

Figure 3:
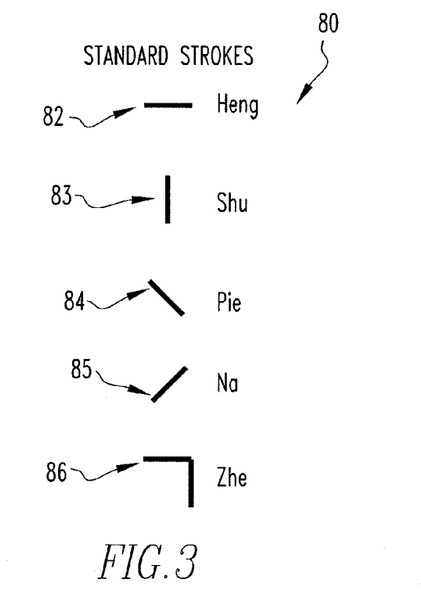
FIG. 3 is a list of standard strokes.
Figure 4:
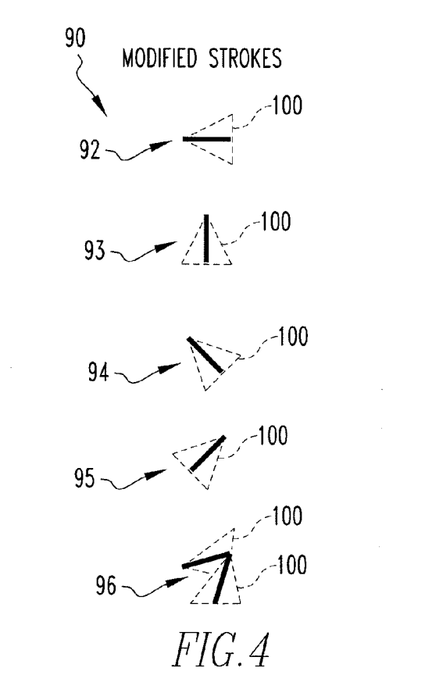
FIG. 4 is a list of modified strokes.
Figure 5A:
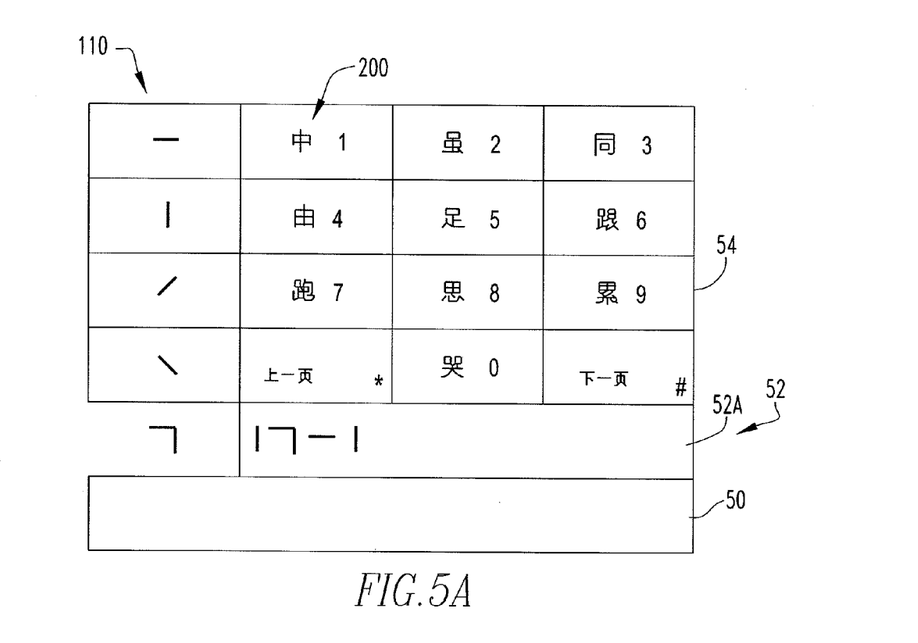
FIG. 5A shows four stokes as input and the suggested output.
Figure 5B:
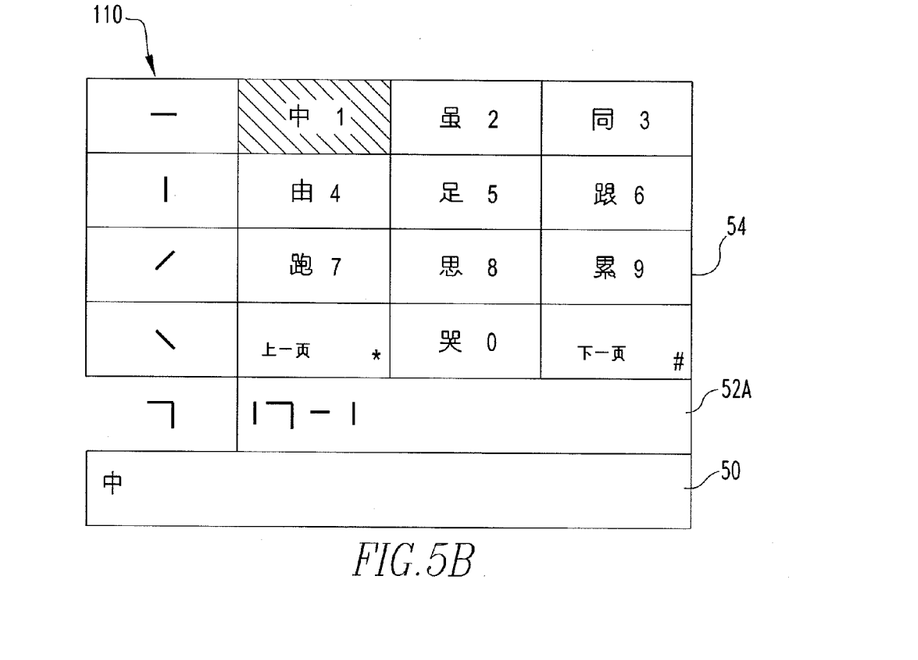
FIG. 5B shows the display as the user selects an output.
Figure 5C:
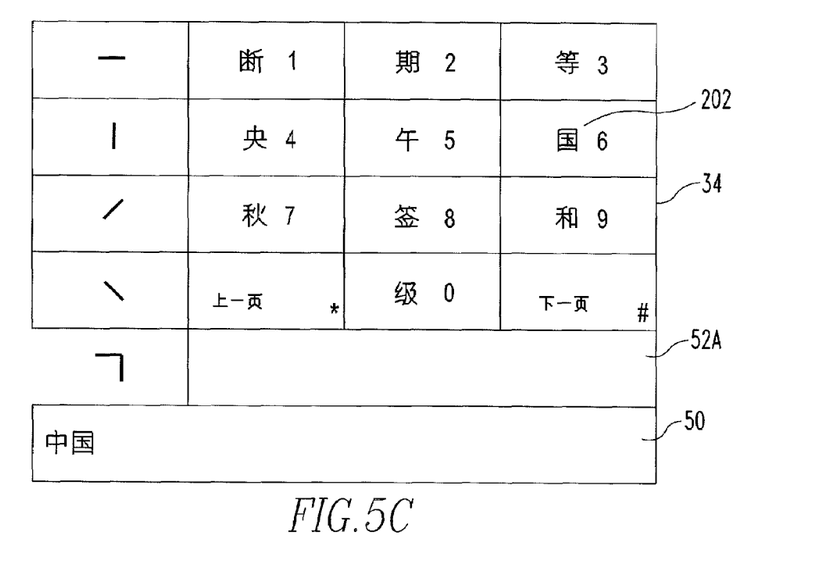
FIG. 5C shows the display after the user has selected an output from the initial selection.
Figure 5D:
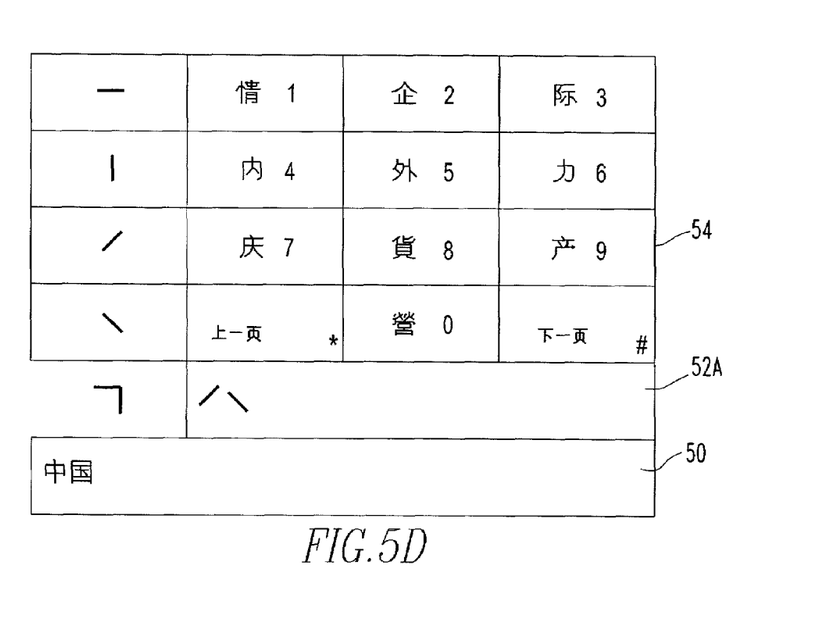
FIG. 5D shows two stokes as input and the initial suggested output.
Figure 5E:
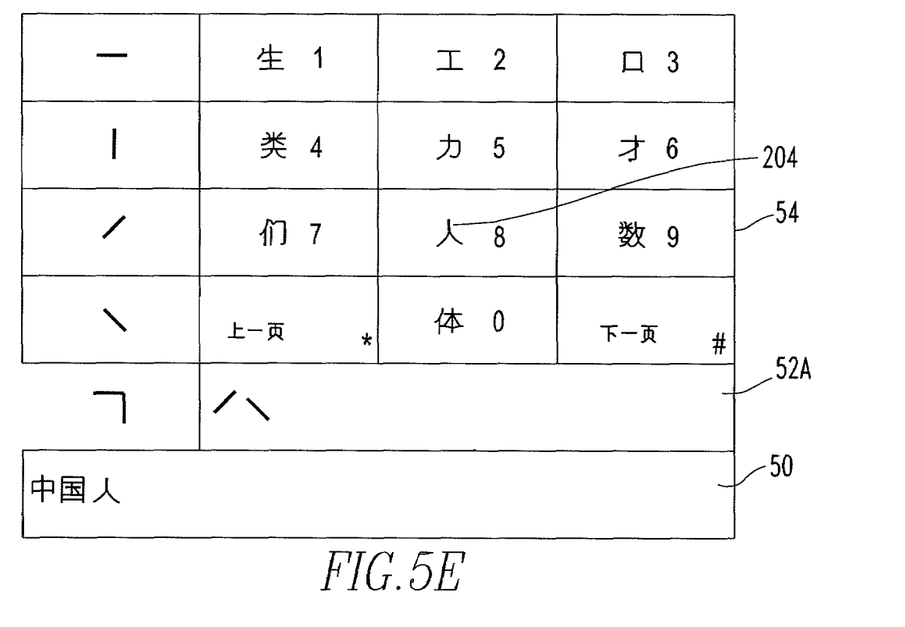
FIG. 5E shows two stokes as input and an alternate suggested output.

As shown in FIGS. 3 and 4, modified strokes 90 generally correspond to the standard stroke elements 80. There are five standard strokes (FIG. 3) heng 82, shu 83, pie 84, na 85 and zhe 86. Thus, there are five corresponding modified strokes (FIG. 4) heng 92, shu 93, pie 94, na 95 and zhe 96. The four generally straight modified strokes 90; heng 92, the horizontal stroke, shu 93, the vertical stroke, pie 94, the downward slant from left to right, and na 95, the downward slant from right to left includes a tolerance 100. For example, modified stroke heng 92 allows for a slight upward or downward angle to the stroke. Preferably, the tolerance 100 for the modified heng 92, shu 93, pie 94, and na 95 strokes is between 10 and 20 degrees from a horizontal line (heng 92), vertical line(shu 93), or a diagonal line extending 45 degrees relative to a vertical axis (pie 94 and na 95 ) and more preferably about 15 degrees from such a line. The standard stroke zhe 96 is a right angle stroke having a horizontal line from left to right, followed by a downward line. As right angles are difficult to create when using a trackball 24, the modified stroke zhe 96 includes a range of angles. That is, the modified stroke zhe 96 is two generally straight lines having an angle of between 30 degrees and 120 degrees, and more preferably about 90 degrees. Further, the line portions of the modified zhe stroke 96 also include a tolerance 100 between 10 and 20 degrees from the associated horizontal or vertical line and more preferably about 15 degrees from such lines.

The stroke-based input user interface routine 62 is structured to correlate the user's stroke-based input of a modified stroke 90 from trackball 24 into one of several standard strokes 80. That is, when a user inputs a modified stroke 90 within the tolerances 100 identified above, the stroke-based input user interface routine 62 correlates that input into a standard stroke 80. The standard stroke 80 is then used by the disambiguation routine 44A to provide a list of probable ideographic language objects 170.

Figure 1A:
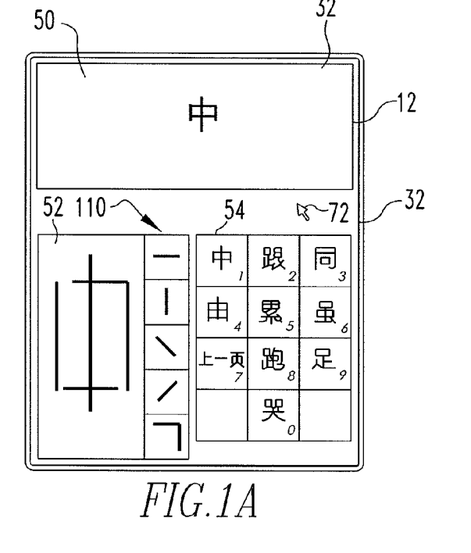
FIGS. 1A and 1B are alternate presentations of the user interface filter portion. It is noted that the ideograms shown in the figure are generic and do not represent a specific language.

Typically, the trackball 24 is associated with the cursor 72 presented on the display 74. The stroke-based input user interface routine 62 is structured to allow the user to switch between a normal "cursor mode" and a "stroke based input mode" for inputting stroke based input. In the preferred embodiment, the user enters a stroke based input mode of the stroke-based input user interface routine 62 following a mode switching event. Preferably, the mode switching event is an action by the user such as, but not limited to, selecting a specific key 26, combination of keys 27, or other input, e.g. pressing inwardly on the trackball 24. In this embodiment, when the stroke-based input user interface routine 62 is in the stroke based input mode, the cursor 72 is not presented and each distinct movement of the trackball 24 is interpreted as a stroke based input, as described below. "Distinct" strokes are, preferably, separated by a pause in the motion of the trackball 24, preferably a pause of between about 0.5 to 2.0 seconds. Thus, for example, a user may press the trackball 24, thereby entering the stroke based input mode of the stroke-based input user interface routine 62, and provide a series of modified strokes 90, as described above. After each modified stroke 90 is entered and the stroke-based input user interface routine 62 correlates the user's stroke-based input of a modified stroke 90 into one of several standard strokes 80, as described below, a representation of the standard stroke 80 may be presented in the display active portion 52. Thus, as the user enters a series of modified strokes 90, a series of standard strokes 80 may be presented in the display active portion 52. It is noted that, in this embodiment, each stroke in the series of strokes will, preferably, be presented as a relatively small representation of the standard stroke 80, e.g. having a size substantially smaller than the display active portion 52, as shown in FIG. 1A. This allows for the clear presentation of multiple, separate standard strokes 80. Operation of the display filter portion 54, which presents probable ideographic language objects 170, is discussed below. After a user selects a probable ideographic language object 170, the display active portion 52 is cleared. When the user has finished using the stroke based input, the user may exit the stroke based input mode of the stroke-based input user interface routine 62 and return to the cursor mode by again selecting a specific key 26, combination of keys 27, or other input, e.g. pressing inwardly on the trackball 24.

It is further noted that the stroke-based input user interface routine 62 may include a "clear" function to delete one or more prior accidental/unintended modified strokes 90. That is, the stroke-based input user interface routine 62 may identify a specific key 26, e.g. the "del" key 26, to perform the function of deleting the prior stroke based input. Accordingly, when the user accidentally moves the trackball 24 between intended modified strokes 90, the stroke-based input user interface routine 62 may interpret the accidental movement as a stroke and present the stroke in the display active portion 52. When this occurs, the user may simply actuate the key 26 corresponding to the clear function to delete the last modified stroke 90 or series of modified strokes 90.

In an alternate embodiment, the cursor 72 may be used to draw the series of modified strokes 90. In this embodiment, when the cursor 72 is disposed over the display active portion 52, the stroke-based input user interface routine 62 is structured to convert the user's stroke-based input into one of several standard stroke elements 80. As before, the user may switch between a cursor mode and the stroke based input mode of the stroke-based input user interface routine 62 following a mode switching event. Preferably, the mode switching event is an action by the user such as, but not limited to, selecting a specific key 26, combination of keys 27, or other input, e.g. pressing inwardly on the trackball 24. Further, in this embodiment, the user may enter the stroke based input mode of the stroke-based input user interface routine 62 by allowing the cursor 72 to hover over the display active portion 52 for a period of time, about 0.5 to 3.0 seconds. Further, the user may exit the stroke based input mode by moving the cursor 72 off the display active portion 52. That is, the hovering of the cursor 72 over the display active portion 52, or the movement of the cursor off the display active portion 52 acts as the mode switching event.

As noted above, inputting a stroke includes at least two steps; inputting a modified stroke 90 and correlating the modified stroke 90 to a standard strokes 80. As further noted above, a stroke-based input device routine 68 is structured to present and track a cursor 72, detect the start of the provided stroke, the path of the provided stroke, and the end of the provided stroke, record the provided stroke, present a corresponding display of the provided stroke, and so forth, as is known in the art. It is noted that, in this embodiment, the user may reposition the cursor 72 between strokes, thus the stroke-based input device routine 68 is structured to determine which movements of the cursor 72 are modified strokes 90 and which movements of the cursor 72 are repositioning movements. Thus, as the user enters the modified strokes 90 using the trackball 24, the stroke-based input user interface routine 62 may be structured to present the modified stroke 90 in the display active portion 52 and then, after the stroke-based input user interface routine 62 correlates that input into a standard stroke 80, update the display active portion 52 to present the standard stroke 80. It is noted that in this embodiment, the standard strokes 80 are presented relatively large relative to the display active portion 52, as shown in FIG. 1. This allows the user to reposition the cursor 72 relative to the presented standard strokes 80 prior to inputting additional modified strokes 90.

Alternately, the stroke-based input user interface routine 62 may be structured to not present the modified stroke 90 in the display active portion 52. That is, stroke-based input user interface routine 62 may be structured to leave the display active portion 52 blank, or un-updated, until the stroke-based input user interface routine 62 correlates that input into a standard stroke 80. After the stroke-based input user interface routine 62 correlates the input into a standard stroke 80, the stroke-based input user interface routine 62 may be further structured to present the standard stroke 80 in the display active portion 52.

After a stroke is entered, correlated, and presented, the user may enter additional strokes. Preferably, the previously entered and presented standard stroke(s) 80 remain presented on the display active portion 52 as new modified strokes 90 are entered. This allows the user to position the subsequent modified stroke 90 in, approximately, the desired location. After the subsequent modified stroke 90 is entered, the stroke-based input user interface routine 62 again correlates the input into a standard stroke 80. As the previously entered and presented standard stroke(s) 80 are positioned on the display active portion 52 at the location where the user created the stroke, the user may see the progression of additional standard strokes 80 being added to the input provided to the disambiguation routine 44A. Alternately, the stroke-based input user interface routine 62 may be structured to clear, or blank, the display active portion 52 after each standard stroke 80 is presented. That is, the standard stroke 80 will remain on the display active portion 52 until the user begins to enter new modified stroke 90, at which point the display active portion 52 is blanked so that the user may clearly see what new standard stroke 80 is being input. In a further alternate embodiment, the stroke-based input user interface routine 62 may be structured to present the previously entered standard strokes 80 in series, as set forth relative to the first embodiment, above and as shown in FIG. 1A.

Further, the user interface output routine 66 is, preferably, structured to produce a representation 110 of the standard strokes 80 adjacent to, or within, the image display active portion 52. The representation 110 of the standard strokes 80 allows a new user to understand what input may be used with the stroke-based input user interface routine 62. The representation 110 of the standard strokes 80 may be turned off to allow a larger area for input on the display active portion 52 once the user learns which modified strokes 90 the stroke-based input user interface routine 62 accepts.

As is known in the art, a disambiguation routine 44A is structured to receive input in the form of various strokes, typically standard strokes 80. The disambiguation routine 44A relates the standard strokes 80 to one or more ideographic language objects 46 that are stored in the memory 40. The disambiguation routine 44A further associates a frequency object 48 with each ideographic language object 46. The disambiguation routine 44A returns those ideographic language objects 46 with a higher frequency object 48 before those ideographic language objects 46 with a lower frequency object 48. It is further noted that, because the individual standard strokes 80 have no meaning, many different ideographic language objects 46 may be related to a given set of standard strokes 80. For example, two vertical strokes, heng 82, and two horizontal strokes, shu 83, may relate to various ideographic language objects 46 that include a generally square box, or, may relate to ideographic language objects 46 having two vertical lines near the right side of the character and two horizontal lines at the top of the character. Moreover, many ideographic language objects 46 will include further strokes. As used herein, groups of visually related ideographic language objects 46 are identified as a family. Thus, for example, one family of ideographic language objects 46 may all include a box-like element and another family of ideographic language objects 46 may all include two vertical lines near the right side of the character and two horizontal lines at the top of the character.

Figure 1B:
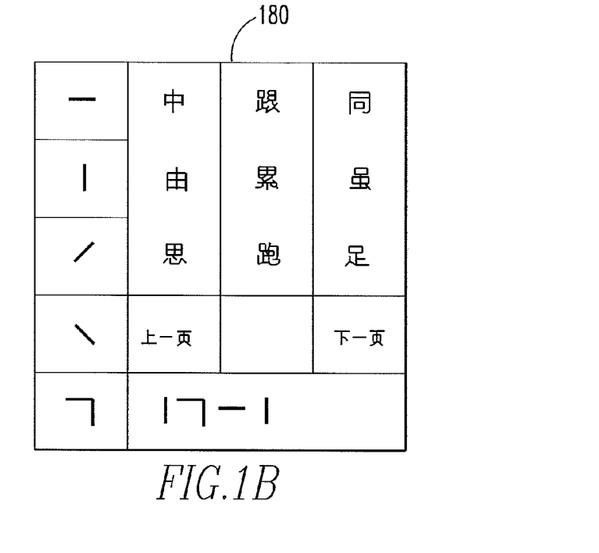

The results, or probable ideographic language objects 170, from the disambiguation routine 44A are presented in the display filter portion 54. It is noted that the display filter portion 54 may display the most common probable ideographic language objects 170 even before any strokes are entered. The probable ideographic language objects 170 may be presented as a columnar list 180 (FIG. 1B) and may be sorted by the probable ideographic language object's 170 associated frequency object 48. If the cursor routine is active, the user may select one of the probable ideographic language objects 170 by placing the cursor 72 over the desired ideographic language object 46 and selecting that ideographic language objects 46. When a user selects a probable ideographic language object 170, that ideographic language object 46 is inserted into the display output portion 50. That is, if the active routine 44 is a message routine 44B, the selected probable ideographic language object 170 is inserted into the message being drafted and the stroke-based input user interface routine 62, or more specifically the user interface output routine 66, displays the selected ideographic language object 46 in the display output portion 50.

In an example embodiment, wherein the cursor routine 44 is not active, the probable ideographic language objects 170 are presented in a pattern, or grid 182, that corresponds to the pattern of the highlighted keys 27. When the probable ideographic language objects 170 are presented in a grid 182 that corresponds to the pattern of the highlighted keys 27, the keypad input routine 70 may temporarily reassign the character associated with the highlighted keys 27 to correspond to the probable ideographic language objects 170 shown on the grid 182. That is, in a keypad 20 that includes Arabic numbers disposed in a telephone keypad configuration, the upper left key is typically associated with the character "1." However, when the disambiguation routine 44A results are shown in a grid 182, the upper right probable ideographic language object 170 in the upper left of the grid 182 may be "tai" (which means "safe"). The keypad input routine 70 may temporarily reassign the upper left highlighted key 27 to correspond to the probable ideographic language object 170 "tai." Thus, when a user selects the upper left highlighted key 27 the probable ideographic language object 170 "tai" is inserted into the display output portion 50. That is, if the active routine 44 is a message routine 44B, the probable ideographic language object 170 "tai" is inserted into the message being drafted and the stroke-based input user interface routine 62, or more specifically the user interface output routine 66, displays the selected ideographic language object 46 in the display output portion 50. It is further noted that the grid 182 may include representations of the Arabic numbers of the highlighted keys 27 thereby showing which highlighted key 27 is associated with the probable ideographic language objects 170.

Given the large number of ideographic language objects 46, there is a substantial chance that the desired ideographic language object 46 will not be displayed in the grid 182 initially. Accordingly, the stroke-based input user interface routine 62 and/or disambiguation routine 44A allows the user to continue to input strokes as set forth above; that is, inputting strokes on the display active portion 52. Each time the user adds a stroke, the disambiguation routine 44A processes all the strokes provided by the user and updates the display filter portion 54 with a new list of probable ideographic language objects 170.

In another embodiment, the disambiguation routine 44A is further structured to present ideographic language objects 46 in the display filter portion 54 that are in the same family as a displayed probable ideographic language objects 170. For example, the probable ideographic language objects 170 displayed in the grid 182 may include an ideographic language object 46 from a family of ideographic language objects 46 having a box in the upper left corner of the grid 182. The opposite corner of the grid 182, i.e., lower right, corner of the grid 182, may display an ideographic language object 46 from a family of ideographic language objects 46 having two vertical lines near the right side of the character and two horizontal lines at the top of the character. When a user selects the ideographic language object 46 having a box in the upper left corner of the grid 182, the disambiguation routine 44A is structured to repopulate the grid 182 with ideographic language objects 46 having a box as well as based on the input previously provided by the user. Thus, if after the user has input all the strokes required to make a specific ideographic language object 46 the desired ideographic language object 46 is not displayed but an ideographic language object 46 similar to the desired ideographic language object 46 is displayed, the user may select the similar ideographic language object 46 causing the grid 182 to be repopulated with other similar ideographic language objects 46 and which, hopefully, includes the desired ideographic language object 46. If the desired ideographic language object 46 is not disclosed after the first selection, the user may repeat the process. It is noted that this method of repopulating the list with similar, but alternate, ideographic language objects 46 may also be used with a columnar list 180.

It is noted that in this embodiment, the user must be able to "select" an ideographic language object 46 to repopulate the grid 182 and "select" an ideographic language object 46 to incorporate into the display output portion 50. This may be accomplished through the use of "clicks" and "double clicks" as is known in the art. That is, a single act of selection, or "click," causes the disambiguation routine 44A to repopulate the grid 182 and two rapidly successive acts of selection, or "double click," causes the ideographic language object 46 to be incorporated into the display output portion 50. Preferably, when a user provides a single act of selection over a specific ideographic language object 46, that ideographic language object 46 remains on the grid 182 in the same location.

In this manner and with the user interface 32, a user may create a message including the selected ideographic language object 46. Once the ideographic language object 46 is selected, the stroke-based input user interface routine 62, and more specifically, the stroke-based input user interface routine 62 and disambiguation routine 44A are reset, or otherwise have the memory 40 associated with the stroke-based input cleared, so that the user may select another ideographic language object 46 using the display active portion 52.

Accordingly, the handheld electronic device 4 structured to execute the user interface routine 60 having the stroke based user interface routine 62, as well as the other routines 44 identified above may be used to perform a method of utilizing stroke based input including the following steps. Presenting 200 a user interface having an active portion 52, a filter portion 54 and an output portion 50. Utilizing 202 a stroke-based input device 22 to enter strokes within the active portion 52. Utilizing 204 a disambiguation routine 44A to produce a list of probable ideographic language objects 170 that is presented in the display filter portion 54. If the desired ideographic language object 46 is presented, the user may select 206 the ideographic language object 46 and the selected ideographic language object 46 is presented 208 in the display output portion 50. If the desired ideographic language object 46 is not presented initially, the user utilizes 210 a stroke-based input device 22 to enter additional strokes within the active portion 52. As the user enters more strokes, the disambiguation routine 44A is again utilized 204 to analyze the strokes and continually updates 212 the list of probable ideographic language objects 170 that is displayed in the display filter portion 54 until the user selects 206 an ideographic language object from the list.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A handheld electronic device comprising:
   a processor apparatus including a memory and a number of routines;
   an input apparatus in electronic communication with said processor apparatus and structured to provide input to said processor apparatus;
   an output apparatus including a display in electronic communication with said processor apparatus and structured to receive output from said processor apparatus;
   said number of routines including at least one user interface routine;
   said at least one user interface routine including a stroke-based user interface routine;
   the processor apparatus being structured to execute said stroke-based user interface routine;
   said stroke-based user interface routine being structured to present a display output portion including a message to be sent, a display active portion including a representation of standard strokes, and a display filter portion including a set of disambiguated ideographic language object outputs, the three portions located separately and adjacent to each other on said display; and
   said stroke-based user interface routine being further structured to:
     receive stroke-based input in the form of modified strokes;
     present a modified stroke in the display active portion;
     correlate the modified stroke to a standard stroke; and
     update the display active portion to replace the modified stroke with the standard stroke and to present the standard stroke relatively large relative to the display active portion for receiving user input.

2. The handheld electronic device of claim 1 wherein:
   said input apparatus including a trackball; and
   the stroke-based user interface routine is structured to receive stroke-based input from said trackball.

3. The handheld electronic device of claim 2 wherein said stroke-based user interface routine is structured to correlate the modified strokes to standard strokes.

4. The handheld electronic device of claim 2, wherein said stroke-based user interface routine is structured to present the modified stroke in the display active portion as the user is entering the stroke.

5. The handheld electronic device of claim 4 wherein said stroke-based user interface routine includes a cursor mode, wherein a cursor is presented, and a stroke based input mode, said stroke-based user interface routine being structured to switch between modes following a mode switching event.

6. The handheld electronic device of claim 5 wherein said stroke-based user interface routine is structured to recognize strokes from the group consisting of: a modified heng stroke, a modified shu stroke, a modified pie stroke, a modified na stroke, and a modified zhe stroke.

7. The handheld electronic device of claim 6 wherein the stroke-based user interface routine is structured to present a representation of the recognizable strokes adjacent to said display active portion.

8. The handheld electronic device of claim 7 wherein
   the number of routines includes at least one disambiguation routine;
   said memory including a number of ideographic language objects and a number of frequency objects;
   at least some of said ideographic language objects having an associated frequency object from said number of frequency objects;
   the processor apparatus being adapted to execute the at least one disambiguation routine, the at least one disambiguation routine structured to detect an ambiguous stroke-based input based on one or more standard strokes and correlate said ambiguous stroke-based input to one or more probable ideographic language objects;
   said at least one disambiguation routine structured to further sort said one or more probable ideographic language objects according to said one or more probable ideographic language object frequency as represented by an associated frequency object and to present a list of at least some of said probable ideographic language objects in said display filter portion; and
   wherein said input assembly may be used to select one of the probable ideographic language objects and, once selected, said stroke-based user interface routine being further structured to present the selected ideographic language object in said display output portion.

9. The handheld electronic device of claim 8 wherein:
   said input assembly further includes a key-based input device;
   said key-based input device having a number of highlighted keys disposed in a pattern, each said highlighted key having one or more character indicia disposed thereon; and
   said at least one disambiguation routine structured to present said list of at least some of said probable ideographic language objects in a pattern corresponding to the pattern of said highlighted keys.

10. The handheld electronic device of claim 9 wherein said at least one disambiguation routine structured to present at least one of the character indicia shown on each highlighted key in said display filter portion.

11. The handheld electronic device of claim 10 wherein said stroke-based user interface routine is structured to receive input from said key-based input device wherein said highlighted key correspond to probable ideographic language objects as shown on said display filter portion and wherein when a highlighted key is actuated, the ideographic language object corresponding to the actuated highlighted key is displayed in said display output portion.

12. The handheld electronic device of claim 7 wherein said at least one disambiguation routine structured to present a columnar list of probable ideographic language objects in said display filter portion.

13. The handheld electronic device of claim 12 wherein when the cursor is placed over a probable ideographic language object and a selecting input is actuated, the ideographic language object corresponding to the probable ideographic language object over which the cursor is disposed is displayed in said display output portion.

14. The handheld electronic device of claim 2 wherein
   the number of routines includes at least one disambiguation routine;
   said memory including a number of ideographic language objects and a number of frequency objects;
   at least some of said ideographic language objects having an associated frequency object from said number of frequency objects;
   the processor apparatus being adapted to execute the at least one disambiguation routine, the at least one disambiguation routine structured to detect an ambiguous stroke-based input based on one or more standard strokes and correlate said ambiguous stroke-based input to one or more probable ideographic language objects;

said at least one disambiguation routine structured to further sort said one or more probable ideographic language objects according to said one or more probable ideographic language object frequency as represented by an associated frequency object and to present a list of at least some of said probable ideographic language objects in said display filter portion; and wherein said input assembly may be used to select one of the probable ideographic language objects and, once selected, said stroke-based user interface routine being further structured to present the selected ideographic language object in said display output portion.

15. The handheld electronic device of claim 14 wherein:
said input assembly further includes a key-based input device;
said key-based input device having a number of highlighted keys disposed in a pattern, each said highlighted key having one or more character indicia disposed thereon; and
said at least one disambiguation routine structured to present said list of at least some of said probable ideographic language objects in a pattern corresponding to the pattern of said highlighted keys.

16. The handheld electronic device of claim 15 wherein said at least one disambiguation routine structured to present at least one of the character indicia shown on each highlighted key in said display filter portion.

17. The handheld electronic device of claim 16 wherein said stroke-based user interface routine is structured to receive input from said key-based input device wherein highlighted key corresponds to probable ideographic language objects as shown on said display filter portion and wherein when a highlighted key is actuated, the ideographic language object corresponding to the actuated highlighted key is displayed in said display output portion.

18. The handheld electronic device of claim 17 wherein said at least one disambiguation routine structured to present a columnar list of probable ideographic language objects in said display filter portion.

19. The handheld electronic device of claim 18 wherein:
said stroke-based user interface routine includes a cursor mode, wherein a cursor is presented, and a stroke based input mode, said stroke-based user interface routine being structured to switch between modes following a mode switching event; and
when the cursor is placed over a probable ideographic language object and a selecting input is actuated, the ideographic language object corresponding to the probable ideographic language object over which the cursor is disposed is displayed in said display output portion.

20. The handheld electronic device of claim 2 wherein said stroke-based user interface routine is structured to recognize strokes from the group consisting of: a modified heng stroke, a modified shu stroke, a modified pie stroke, a modified na stroke, and a modified zhe stroke.

21. A method for use in a handheld electronic device including a display, comprising:
presenting a display output portion including a message to be sent, a display active portion including a representation of standard strokes, and a display filter portion including a set of disambiguated ideographic language object outputs, the three portions located separately and adjacent to each other on the display;
receiving stroke-based input in the form of modified strokes;
presenting a modified stroke in the display active portion;
correlating the modified stroke to a standard stroke; and
updating the display active portion to replace the modified stroke with the standard stroke and to present the standard stroke relatively large relative to the display active portion for receiving user input.

* * * * *